(12) United States Patent
Ouellette et al.

(10) Patent No.: US 6,202,601 B1
(45) Date of Patent: Mar. 20, 2001

(54) METHOD AND APPARATUS FOR DUAL FUEL INJECTION INTO AN INTERNAL COMBUSTION ENGINE

(75) Inventors: Patric Ouellette; Brad Douville, both of Vancouver (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 09/503,034

(22) Filed: Feb. 11, 2000

(51) Int. Cl.⁷ .................................................... F02M 21/02
(52) U.S. Cl. ...................... 123/27 GE; 123/526; 123/299
(58) Field of Search ............... 123/27 GE, 525, 123/526, 299, 575, 431

(56) References Cited

U.S. PATENT DOCUMENTS

| | | | |
|---|---|---|---|
| 5,315,973 | * 5/1994 | Hill et al. | 123/525 |
| 5,329,908 | 7/1994 | Tarr et al. | 123/527 |
| 5,365,902 | 11/1994 | Hse | 123/299 |
| 5,711,270 | 1/1998 | Pedersen | 123/304 |
| 5,890,459 | * 4/1999 | Hedrick et al. | 123/299 |
| 5,996,558 | * 12/1999 | Ouellette et al. | 123/27 GE |

FOREIGN PATENT DOCUMENTS

WO 96/03578   2/1996   (WO) .

* cited by examiner

*Primary Examiner*—Erick Solis
(74) *Attorney, Agent, or Firm*—McAndrews, Held & Malloy, Ltd.

(57) ABSTRACT

Two different fuels are injected into the combustion chamber of an internal combustion engine. A main fuel is ignited by a pilot fuel that is more readily flammable than the main fuel. According to the method, load conditions on the engine are monitored and sets of conditions are defined to constitute low load conditions and high load conditions. Distinct operating modes are defined for each set of load conditions. Under low load conditions, a homogeneous mixture of main fuel and air is too lean to be flammable; consequently, the main fuel is injected at high pressure immediately following injection of the pilot fuel. Under high load conditions, fuel is injected in three stages. In the first stage, the main fuel is injected during the intake stroke or early in the compression stroke to form a substantially homogenous mixture of main fuel and air. However, the risk of knocking limits the quantity of main fuel that can be introduced in the first stage. In the second stage, the pilot fuel is injected near top dead center and ignites the homogenous mixture of fuel and air. Since the amount of fuel that could be injected in the first stage was limited by the knock limit, an additional quantity of main fuel is injected in a third stage during the power stroke.

45 Claims, 6 Drawing Sheets

METHOD AND APPARATUS FOR DUAL FUEL INJECTION INTO AN INTERNAL COMBUSTION ENGINE

FIELD OF THE INVENTION

The present invention relates to a technique for dual fuel injection into the combustion chamber of an internal combustion engine. More specifically, the present invention relates to a dual fuel injection technique suitable for application in the internal combustion engines of cars, trucks, buses, locomotives, ships and other forms of transportation, as well as in engines related to energy production and industrial applications.

BACKGROUND OF THE INVENTION

The conversion of diesel engines into natural gas operation has been an aspiration of the internal combustion engine industry for a period of time. Natural gas is a clean burning fuel (relative to diesel) with improved emission levels of both nitrogen oxides ($NO_x$) and particulate matter. A known technique in the art for converting diesel engines to natural gas operation is called dual-fuel operation. Typically, in this method, natural gas is mixed with the intake air prior to the introduction of the air/natural gas mixture into the engine cylinder (a process known in the art as fumigation). The homogeneous mixture is then introduced into the piston cylinder during the intake stroke. During the compression stroke, the pressure and temperature of the homogeneous mixture are increased. Near the end of the compression stroke, a small quantity of pilot diesel fuel is used to ignite the air/natural gas mixture. The advantage of the homogeneous mixture of air and natural gas is that the combustion fuel to air ratio (F/A) can be controlled, so as to cause the fuel to burn in a "propagation combustion mode". In this propagation combustion mode, it is possible to realize the advantages of "lean burn" operation, including lower $NO_x$ emissions, lower particulate matter, and efficient combustion. This dual fuel method has two main disadvantages, however. The first main disadvantage is encountered at high load engine operating conditions, when the elevated temperature and pressure in the piston cylinder during the compression stroke makes the air/natural gas mixture susceptible to premature detonation, or "knocking". Knocking is an uncontrolled combustion process and it can damage engines. Measures to reduce the risk of knocking include lowering the compression ratio of the piston stroke or limiting the power and torque output, but these measures cause a corresponding reduction in the engine's cycle efficiency (that is, not as much power is available from each piston stroke). The second main disadvantage is that under low load engine operating conditions, the mixture of fuel and air becomes too lean to burn. The intake air flow can be throttled to maintain flammability of the mixture, but this adversely affects the engine efficiency.

Recently, a different type of dual fuel combustion engine, herein referred to as a "high pressure direct injection" (HPDI) gas engine has become known in the art. Similar to the conventional dual fuel process described above, HPDI gas engines burn a large quantity of gaseous fuel, yielding an improvement (over diesel engines) with respect to the emission levels of $NO_x$ and particulate matter. In addition, HPDI gas engines purport to achieve the same combustion efficiency, power and torque output as state of the art diesel engines. The operational principle underlying HPDI gas engines is that two fuels are injected under pressure into the chamber near the end of the compression stroke. According to one method, a small quantity of "pilot fuel" (typically diesel) is injected into the cylinder immediately followed by a more substantial quantity of gaseous fuel. The pilot fuel readily ignites at the pressure and temperature within the cylinder at the end of the compression stroke, and the combustion of the pilot fuel initiates the combustion of the gaseous fuel that might otherwise be difficult to ignite. Known HPDI gas engines have no pre-mixture of fuel and air; as a result, they operate in a "diffusion combustion" mode, rather than propagation combustion mode. In a diffusion combustion mode, the bulk of the combustion is believed to occur in a local near-stochiometric reaction zone, where the temperature and resulting $NO_x$ formation are relatively high (compared to the temperature and resulting $NO_x$ formation caused by a lean burn propagation combustion mode).

In U.S. Pat. No. 5,365,902 (hereinafter referred to as the '902 patent), a method and apparatus for dual fuel injection is disclosed, which combines some of the advantages of diffusion combustion and propagation combustion. According to the '902 patent, the engine load conditions are detected, and under low load conditions, the pilot fuel is injected into the cylinder prior to the injection of the main gaseous fuel. When the main fuel is injected after pilot fuel injection, it combusts in a diffusion mode shortly after entering the combustion chamber. Alternatively, under high load conditions, the main gaseous fuel is injected into the combustion chamber prior to the injection of the pilot fuel. In this manner, the main gaseous fuel that is injected prior to the introduction of the pilot fuel will mix with air in the combustion chamber, so as to form a homogeneous mixture and burn in a propagation type combustion mode.

The principal drawback of the dual fuel injection technique disclosed in the '902 patent is the risk of premature ignition (knocking) under high load conditions. As the load is increased, the required fuel to air (F/A) ratio of the early-injected main gaseous fuel is increased. When the F/A ratio is high, there is a risk that compression (and the resulting increase in temperature and pressure) of the early-injected main gaseous fuel will cause it to ignite prior to the injection of the pilot fuel. This limit on the quantity of early-injection main gaseous fuel is referred to in this application as the "knock limit". Because the device disclosed in the '902 patent is knock limited, it can not be used for engines which target a high power density, nor can it operate efficiently under high load conditions. As mentioned above, knocking can also cause damage to the engine, reduce engine durability, limit the range of gaseous fuel quality or fuel composition that can be used, and limit the engine's power output.

U.S. Pat. No. 5,329,908 (hereinafter referred to as the '908 patent), discloses a method of using high pressure direct injection of gaseous fuel. According to the method taught by the '908 patent, gaseous fuel is injected at high pressure, near top dead center of the piston's compression stroke, thereby providing diesel-like combustion efficiencies. When the pressure of the gas reservoir drops below about 2,000 pounds per square inch, a controller changes the injection mode, causing the gaseous fuel to be introduced to the cylinder much earlier. For example, the gaseous fuel may be injected during the conventional intake stroke (that is, when air is being drawn into the combustion chamber). In this manner, the gaseous fuel is caused to mix with the air in the combustion chamber, forming a homogeneous mixture that will burn in a propagation mode of combustion. The method disclosed in the '908 patent requires a spark or glow plug to ignite the gaseous fuel in the combustion chamber.

The method disclosed in the '908 patent has several disadvantages. When operating in its early injection mode (that is, below 2000 pounds per square inch), it is subject to knocking, as discussed above, limiting engine efficiency and power density. Also, under low load conditions, the engine will reach a limit where it can not burn the early-injected gaseous fuel efficiently, because the (F/A) ratio of the mixture is too low. This low load limit, resulting from a low F/A ratio, is referred to in this application as the "flammability limit". The method disclosed in the '908 patent also relies on a glow plug or spark plug, yielding different combustion characteristics than fuel ignited by pilot diesel. In general, conventional systems that employ glow plugs or spark plugs require a significant quantity of flammable mixture to be formed prior to ignition, which results in large heat release rates and relatively high $NO_x$ formation.

PCT/International Publication No. WO 96/03578 (hereinafter referred to as the '578 PCT publication) discloses a method of reducing $NO_x$ and particulate matter emissions in diesel internal combustion engines. The '578 PCT publication discloses a technique of pre-injecting a small quantity of diesel fuel into the combustion chamber during the intake stroke, so that during the compression stroke, partially oxidized and/or peroxidized products with strong chemical affinity are formed. These products act as combustion accelerators for the main injection phase, reducing $NO_x$ and particulate matter emissions and noise produced during combustion. One drawback of the method disclosed in the '578 PCT publication is that the entire quantity of diesel fuel injected during the intake stroke does not contribute to the power stroke. As a result, there is a consequential reduction in efficiency. The '578 PCT publication discloses a single fuel method that employs a diesel pre-injection phase PCT publication does not disclose a dual fuel method or the use of a gaseous fuel source.

U.S. Pat. No. 5,711,270 (hereinafter referred to as the '270 patent) discloses a technique for high pressure injection of both oil and gaseous based fuel. The timing and the quantity of gaseous fuel injection is varied when the engine is under different load conditions, and the ignition of the fuel is always commenced with the introduction of the oil based fuel (that is, the pilot fuel) into the combustion chamber. The '270 patent discloses one method of implementing the aforementioned HPDI process. Because the '270 patent discloses always injecting the pilot fuel first, to initiate combustion, followed by the injection of the gaseous fuel, this method shares the same major disadvantages as other known HPDI methods, which include constantly burning in a diffusion mode of combustion and not being able to take advantage of lean burn combustion in a propagation mode, which yields lower $NO_x$ and particulate matter emissions.

The present dual fuel injection technique provides an improved method for the injection of fuel into the combustion chamber of an internal combustion engine. Preferably, the fuel consists primarily of a gaseous fuel, but also includes a more readily ignitable pilot fuel to assure ignition and to improve combustion characteristics.

The present dual fuel injection technique also provides a method of dual fuel injection into the combustion chamber of an internal combustion engine, which combines the advantages of lean-burn homogeneous propagation combustion over a range of operational conditions with some of the advantages of diffusion combustion in low and high load operational conditions.

The present dual fuel injection technique further provides a method of dual fuel injection into the combustion chamber of an internal combustion engine, which utilizes pre-mixed fuel giving rise to a lean burn propagation combustion under intermediate loads, but which does not suffer from a flammability limitation under low load conditions and does not suffer from a knock limitation under high load conditions.

The present dual fuel injection technique provides a method of dual fuel injection into the combustion chamber of an internal combustion engine, which retains the full high efficiency and high cycle output of high pressure direct injection (HPDI), retains the advantage of lower $NO_x$ and particulate matter emissions normally associated with lean burn propagation combustion of pre-mixed fuel, and achieves maximum power density in a knock resistant fashion.

SUMMARY OF THE INVENTION

An improved method introduces fuel into the combustion chamber of an operating four-stroke internal combustion engine. The engine comprises at least one cylinder with a piston. The fuel introduced into the combustion chamber comprises a main fuel and a pilot fuel that is more readily auto-ignitable than the main fuel. The method comprises:

(a) detecting a set of load conditions on the engine;

(b) employing a low load operating mode when a first predetermined set of load conditions is detected, and employing a high load operating mode when a second predetermined set of load conditions is detected, wherein at an operable given engine speed, the second set of load conditions corresponds an engine load that is greater than the engine load corresponding to the first predetermined set of load conditions;

(c) in the low load operating mode, introducing the pilot fuel and the main fuel into the combustion chamber when the cylinder is pressurized, when the piston is at or near top dead center; and (d) in the high load operating modes introducing the pilot fuel and the main fuel into the combustion chamber in three sequential stages, whereby a first portion of the main fuel is introduced in a first stage during at least one of an intake stroke and a compression stroke, the pilot fuel is introduced in a second stage so that it ignites at the beginning of a power stroke, and a second portion of the main fuel is introduced in a third stage.

In a preferred method, the low load operating mode further comprises introducing the pilot fuel in a timed manner such that the pilot fuel ignites at the beginning of the power stroke. That is, the pilot fuel is ignited when the piston is at or near top dead center. The pilot fuel is most preferably ignited contemporaneously with the piston reaching the top dead center position, at the beginning of the power stroke. Pilot fuel ignition may even be commenced before the piston reaches top dead center, however, so long as the majority of fuel combustion occurs during the power stroke.

When at least a portion of the main fuel is introduced sequentially after the pilot fuel (late injection), according to the present preferred method, the late injected portion of the main fuel is introduced within between zero and fifty degrees of crankshaft rotation after the introduction of the pilot fuel.

When at least a portion of the main fuel is introduced before the pilot fuel (early injection), in a preferred method the introduction of the early injected main fuel is completed before the second stage pilot fuel introduction commences. It is generally desirable to introduce the early injected main fuel earlier rather than later since this affords a greater opportunity for the early injected main fuel to mix with the intake air to form a homogeneous mixture. Accordingly, in a preferred method, the first stage, early injected, main fuel introduction occurs during the intake stroke. In an alternate method, the first stage, early injected, main fuel introduction occurs when the piston is at or near bottom dead center.

In the high load operating mode, the second stage pilot fuel introduction occurs when the piston is near top dead center near the end of the compression stroke. Similar to the low load operating mode, it is desirable for the introduction of pilot fuel to be timed so that the pilot fuel ignites at the beginning of the power stroke when the piston is at top dead center or immediately thereafter.

In one embodiment of the present method, when the high load operating mode is selected, the second stage pilot fuel introduction continues when the third stage main fuel introduction commences. Accordingly, although the commencement of the second and third stages is sequential, there may be instances during which pilot fuel and main fuel are being introduced simultaneously. Alternatively, the second and third stages may commence simultaneously, with the third stage being longer in duration.

The preferred method may further comprise:

(e) employing an intermediate load operating mode when a third predetermined set of load conditions is detected, wherein at any given engine speed, the third predetermined set of load conditions corresponding to an engine load that is greater than the engine load corresponding to the first predetermined set of load conditions, the third predetermined set of load conditions corresponding to an engine load that is less than the engine load corresponding to the second predetermined set of load conditions;

wherein the intermediate load operating mode comprises sequential introduction of main fuel and pilot fuel into the combustion chamber, whereby the main fuel is introduced into the combustion chamber before the pilot fuel, the pilot fuel is introduced during the compression stroke, and the introduction of pilot fuel is timed such that the pilot fuel ignites substantially at the beginning of the power stroke.

When an intermediate load operating mode is employed, the early injected main fuel is introduced in a manner so that a substantial quantity of the main fuel intermixes with air within the cylinder prior to combustion. Preferably, the main fuel and the air become a homogenous mixture. To provide more time and opportunity for the main fuel and air to mix, in a preferred method the main fuel is introduced into the combustion chamber during the intake stroke. In this way, the main fuel and air are mixed during the remainder of the intake stroke and the entire duration of the compression stroke.

When the high load operating mode is employed, the quantity of the main fuel introduced during the third stage may be controlled depending upon the detected set of load conditions. For example, the quantity of main fuel introduced during the third stage may be increased when the detected set of load conditions indicates that engine load is increasing. To reduce $NO_x$ and particulate matter emissions, when more fuel is needed to satisfy the required engine load, it is generally preferable to increase the quantity of main fuel instead of increasing the quantity of pilot fuel.

In a preferred method the quantity of the main fuel introduced during the first stage is variable and dependent upon the detected set of load conditions. The engine preferably has a calibrated knock limit and the quantity of main fuel introduced is preferably controlled during the first stage to provide lean burn propagation mode combustion and to maintain a main fuel to air ratio that is less than the knock limit.

The value of the knock limit may change depending upon engine speed, and when the engine speed changes, it may be necessary to adjust the quantity of main fuel introduced during the first stage to prevent knocking. The knock limit may also change when the main fuel composition changes. For example, the composition and quality of natural gas may vary in different parts of the world, or even within the same part of the world. When the composition and quality of the fuel is variable, there may be a series of calibration values that depend upon the fuel composition and quality. The quantity of main fuel that is introduced during the first stage may then be adjusted in accordance with the calibration values determined for the present main fuel composition and quality.

In an alternative embodiment, to simplify the fuel injection control when the high load operating mode is selected, the quantity of main fuel introduced during the first stage may be held constant. In this embodiment, to protect against knocking, a fixed quantity of main fuel is selected that provides a main fuel to air ratio that is less than a calibrated knock limit at all engine speeds and for the broad range of anticipated compositions and qualities of main fuel. That is, in this embodiment, there may be load conditions when the main fuel to air ratio is much less than the knock limit.

In a preferred method, the first predetermined set of load conditions is determined by when the main fuel to air ratio is less than a calibrated flammability limit. This preferred method limits combustion in a pure diffusion mode to only the conditions when the required amount of fuel will not sustain combustion in a propagation mode.

In the preferred method, detecting the set of load conditions on the engine comprises measuring engine speed and engine throttle position. Additional parameters may also be optionally monitored and considered when determining fuel requirements and injection timing. For example, the method may further comprise one or more of the following:

(1) measuring engine intake air temperature;

(2) measuring engine coolant temperature;

(3) measuring intake air boost pressure;

(4) measuring air flow into the combustion chamber; and (5) sensing pre-mature detonation within the cylinder.

In one embodiment of the method, main fuel early injection is accomplished by employing fumigation to pre-mix the main fuel with intake air prior to being introduced into the combustion chamber. This method requires an additional fuel injector associated with an external vessel for introducing the main fuel into the intake air stream. For example, such a fuel injector could be located in the intake air manifold upstream of the intake valve. Fumigation could be used for introducing the main fuel in the intermediate load operating mode or in the first stage of the high load operating mode.

The method may further comprise defining a predetermined main fuel to pilot fuel ratio (Fg/Fp) dependent upon the detected set of load conditions on the engine and introducing quantities of main fuel and pilot fuel to the combustion chamber in accordance with the predetermined Fg/Fp ratio. The Fg/Fp ratio may be determined, for example, empirically for different sets of load conditions. Once the desired quantity of main fuel Fg is determined, in the high load operating mode, the quantity of main fuel introduced in the first stage is limited to prevent the main fuel to air ratio (Fg/A) from exceeding a calibrated knock limit.

A control system is preferably employed to control the timing for introducing the main fuel and the pilot fuel into the combustion chamber based upon the detected set of load conditions.

In a preferred method, the main fuel is gaseous, and preferably selected from the group consisting of natural gas and hydrogen. However, the main fuel may also be a liquid, such as liquefied petroleum gas (liquid propane, for example). The pilot fuel may be a liquid, and is preferably selected from the group consisting of diesel fuel and dimethylether.

The engine employing the disclosed method may provide power to a vehicle, such as, for example, a car, a truck, a ship or a submarine. However, the engine may also be used as part of a stationary power plant, for example, to provide mechanical power or to generate electricity. In a further embodiment, an improved method introduces fuel into the combustion chamber of an operating internal combustion engine having at least one cylinder with a piston. The fuel comprises a main fuel and a pilot fuel that is more readily auto-ignitable than the main fuel. The method comprises introducing fuel into the combustion chamber in three sequential stages, whereby:

(a) a first portion of the main fuel is introduced in a first stage;
(b) fuel is introduced in a second stage; and
(c) a second portion of the main fuel is introduced in a third stage;

wherein the quantity of main fuel introduced in the first stage is controlled to maintain a fuel to air ratio less than a calibrated knock limit but more than a calibrated flammability limit. The first stage preferably occurs during an intake stroke and the second stage preferably occurs during a compression stroke and is timed so that the pilot fuel ignites when the piston is at the beginning of a power stroke.

An improved apparatus introduces fuel into the combustion chamber of an operating internal combustion engine having at least one cylinder with a piston. The fuel comprises a main fuel and a pilot fuel. The pilot fuel is more readily auto-ignitable than the main fuel. The apparatus further comprises:

(a) measuring devices for collecting operational data from the internal combustion engine, the measuring devices comprising a tachometer for measuring engine speed and a sensor for determining throttle position;
(b) an electronic control unit that receives the operational data and processes the data to compute a set of load conditions, the electronic control unit comprising memory for storing control sets of load conditions and predetermined operating modes for the control sets of load conditions, the electronic control unit matching the computed set of load conditions with the control sets of load conditions to select one of the predetermined operating modes;
(c) main fuel injector controlled by the electronic control unit to introduce the main fuel into the combustion chamber at times and in quantities determined by the electronic control unit in accordance with the predetermined operating modes and the set of load conditions; and
(d) a pilot fuel injector controlled by the electronic control unit to introduce the pilot fuel into the combustion chamber at times and in quantities determined by the electronic control unit in accordance with the predetermined operating modes and the set of load conditions;

wherein the predetermined operating modes comprise a low load operating mode and a high load operating mode. In the low load operating mode, the pilot fuel and the main fuel are introduced into the combustion chamber when the cylinder is pressurized. The high load operating mode comprises three stage sequential introduction of fuel into the combustion chamber, whereby a first portion of the main fuel is introduced in a first stage, the pilot fuel is introduced in a second stage, and a second portion of the main fuel is introduced in a third stage. The first stage is preferably temporally isolated from the second and third stages such that the first stage is completed before the second and third stages begin.

In a preferred embodiment of the apparatus, a dual fuel injector may be employed which integrates into a single device both the main fuel injector and the pilot fuel injector. The dual fuel injector may inject either one of the main fuel or pilot fuel independently of each other.

In an alternate embodiment of the apparatus, the apparatus further comprises an auxiliary injector for introducing at least a portion of the main fuel into the air induction system. The auxiliary injector may be located at any point in the air induction system. In this alternate embodiment, the main fuel may be introduced through the auxiliary injector when the main fuel to air ratio is higher than the flammability limit. The portion of the main fuel that is introduced through the auxiliary injector has an opportunity to mix with the intake air prior to being introduced to the combustion chamber. Another advantage of this alternate embodiment is that the main fuel can be introduced through the auxiliary injector at low pressure thereby increasing efficiency by reducing the quantity of fuel that needs to be introduced directly into the at high pressure. When the engine comprises a plurality of pistons, a plurality of auxiliary injectors may be employed.

The measuring devices may further comprise one or more of the following: a probe for measuring the engine intake air temperature, a probe for measuring engine coolant temperature, a device for measuring the intake air boost pressure, a flowmeter for measuring air flow into the combustion chamber, and a sensor device for detecting pre-mature detonation within the combustion chamber.

When the apparatus comprises a sensor for detecting pre-mature detonation, when pre-mature detonation is detected, the electronic control unit may reduce the quantity of the main fuel introduced in the first stage to prevent a re-occurrence.

Further advantages of the present dual fuel injection technique will become apparent when considering the drawings in conjunction with the detailed description.

BRIEF DESCRIPTION OF THE DRAWINGS

FIG. 1 shows two graphs that illustrate examples of how load conditions may be used to define a plurality of operating modes.

FIG. 3, which comprising FIG. 3a depicts a portion of the main fuel being injected into the combustion chamber during the intake stroke, and FIG. 3b depicts the injection of a pilot fuel and the remainder of the main fuel near top dead center, near the beginning of the power stroke.

FIG. 4, which comprises FIG. 4a depicts the main fuel being injected into the combustion chamber during the intake stroke, and FIG. 4b depicts the injection of a pilot fuel near top dead center.

DETAILED DESCRIPTION OF PREFERRED EMBODIMENT(S)

In present method, fuel is injected into the combustion chamber of a four-stroke internal combustion engine having at least one reciprocating piston and a crankshaft associated with the piston. The method involves two fuels, one of which is a pilot fuel, which auto-ignites more readily than the second fuel. The second fuel is preferably a gaseous fuel such as, for example, natural gas or hydrogen gas. In a preferred embodiment, the pilot fuel is conventional diesel fuel or dimethylether.

Figure 1A:
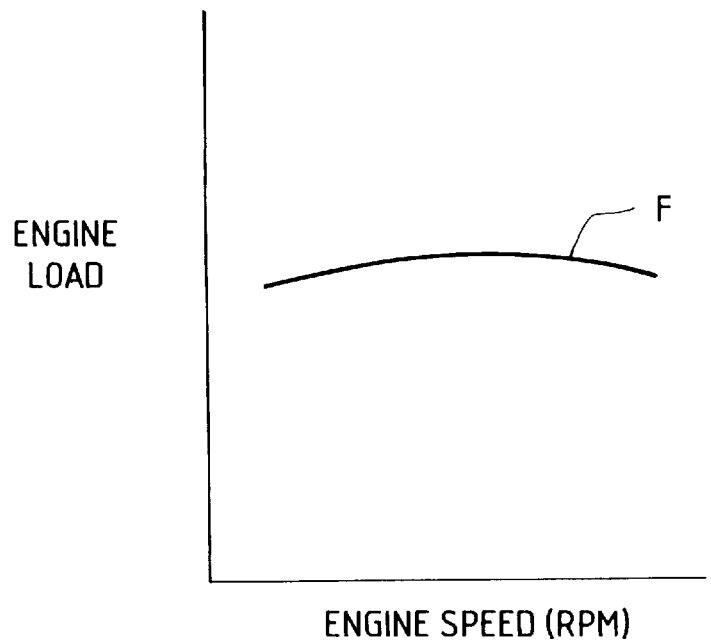
In FIG. 1a, the horizontal axis represents engine speed, the vertical axis represents the fuel to air ratio, and load conditions for two different operating modes are defined.

According to the present method, the load conditions of the engine are monitored and certain sets of conditions are defined to constitute conditions when different operating modes are employed. For example, the introduction of fuel into the combustion chamber may be controlled differently in a low load operating mode compared to a high load operating mode. The present method contemplates at least two operating modes. FIG. 1a is of plot of engine load against engine speed, which may be measured, for example by measuring the speed of crankshaft rotation in rotations per minute (RPM). FIG. 1a graphically illustrates two regions divided by line F determined by the "flammability limit" of the fuel to air ratio for the engine. The flammability limit is defined as the fuel to air ratio at which the quantity of gaseous fuel within the piston cylinder will not support stable flame propagation combustion.

In a preferred embodiment, there are three operating modes that correspond to predefined low, intermediate, and high load conditions. These three regions are graphically depicted in FIG. 1b. The horizontal axis again represents engine speed (that is, crankshaft rotation), measured in revolutions per minute (RPM), and the vertical axis, in this case, indicates fuel to air ratio, which is a parameter that correlates to the load on the engine. The fuel to air ratio increases with engine load for a fixed engine speed. Region A represents a low load region, region B represents an area of intermediate load conditions, and region C represents an area corresponding to high load conditions.

Figure 1B:
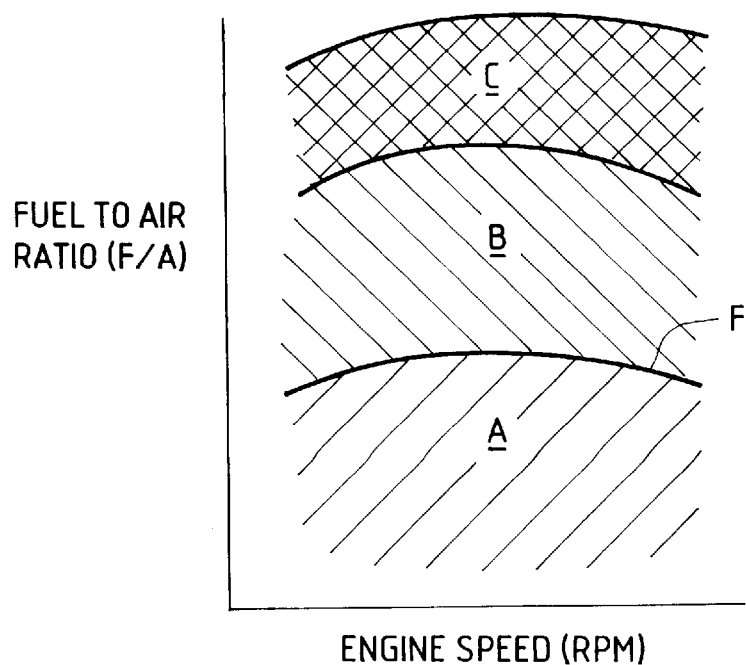
In FIG. 1b, the vertical axis represents engine load and load conditions for three different operating modes are defined.

The plots depicted in FIG. 1 (FIGS. 1a and 1b) show only the general shape of predefined regions that correspond to different operating modes. Persons skilled in the art will understand that the actual numerical values for RPM and load or fuel to air ratio depend upon the individual characteristics of a particular engine design (for example, the size of the cylinder bore, the length of the stroke, the compression ratio, or the shape of the combustion chamber). That is, engines of different design may have different regional boundaries between operating modes. The numerical values and the shape of the boundary line for a specific engine may be determined empirically or theoretically.

With reference to FIG. 1a, when the engine load requires a fuel to air ratio that is below the flammability limit (that is, line F), this generally corresponds to a set of load conditions under which a low load operating mode is employed.

Figure 2:
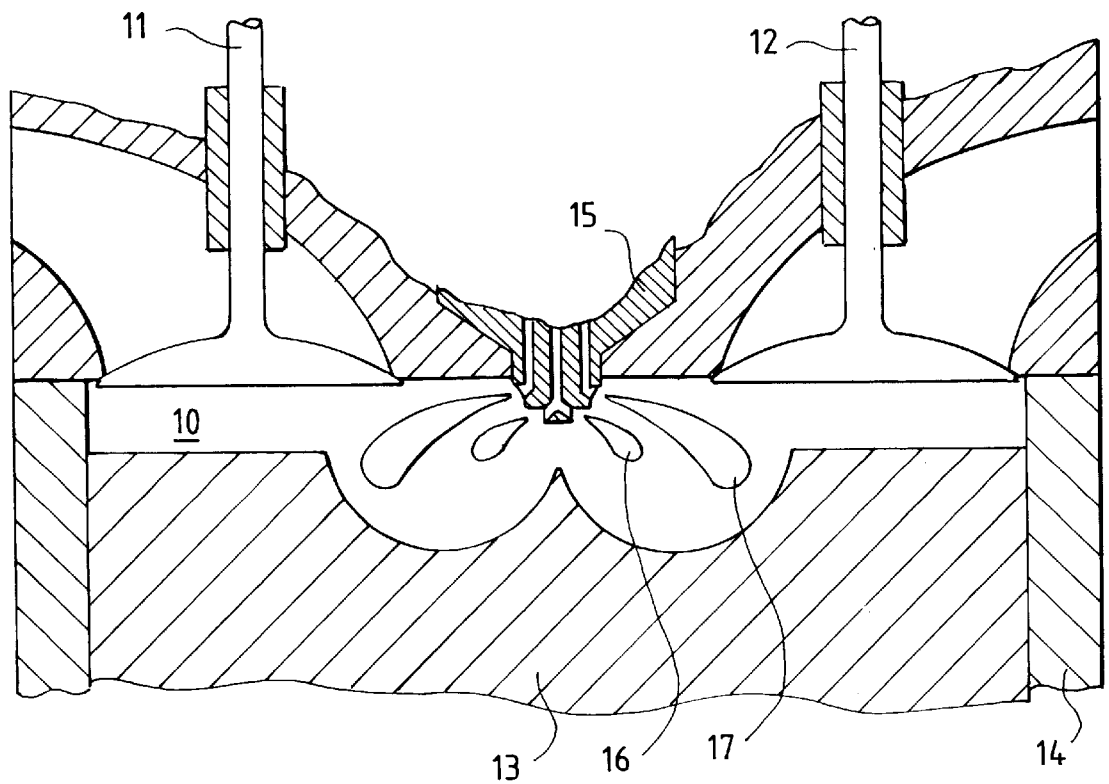
FIG. 2 is a partial cross section view of an engine combustion chamber that shows pilot fuel and a main fuel, both being injected into the combustion chamber near top dead center under low load conditions.

FIG. 2 illustrates a preferred method of introducing fuel into combustion chamber 10 when a low load operating mode is employed. Intake valve 11 and exhaust valve 12 are closed and piston 13 is at or near top dead center in piston cylinder 14. At this time, the power stroke is initiated by the introduction of pilot fuel 16 through injector 15. Since there is an "ignition delay" between the introduction of pilot fuel 16 and actual ignition and combustion, pilot fuel 16 is preferably introduced just before piston 13 reaches top dead center. For example, pilot fuel 16 may be introduced between 30 degrees before top dead center and 20 degrees after top dead center (measured by degrees of crankshaft rotation). The actual timing within this range may be set with consideration to measured operating parameters such as engine speed. For example, as engine speed increases, pilot fuel 16 may be introduced into combustion chamber 10 earlier in the engine cycle so that combustion after the ignition delay will substantially coincide with when piston 13 is at top dead center.

Main fuel 17 is preferably introduced into combustion chamber 10 sequentially, that is, after the introduction of pilot fuel 16. However, as shown in FIG. 2, pilot fuel 16 and main fuel 17 may also be introduced simultaneously, for example, by commencing pilot and main fuel introduction simultaneously, or by overlapping fuel introduction (that is, introducing pilot fuel 16 first, but then introducing main fuel 17 while pilot fuel 16 is still being injected). Whether or not there is an overlap may depend, for example, upon engine speed and/or the quantity of fuel that is needed to satisfy the engine load. For example, as engine speed and the quantity of fuel increase, there may be more of an overlap.

According to the preferred method, when the low load operating mode is employed, main fuel 17 is not well mixed with the intake air and main fuel 17 burns in a diffusion mode. In the low load operating mode, less mixing is desirable to improve combustibility since the fuel to air ratio is below the flammability limit. Accordingly, in this mode, main fuel 17 is more concentrated and ignitable near the injector where pilot fuel is burning. Unlike with conventional methods that introduce gaseous fuel with the intake air, there is no need to restrict the quantity of air that is drawn into the combustion chamber to ensure the combustibility of the fuel. Consequently, when the disclosed low load operating mode is employed, there are no parasitic pressure losses caused by restricting the flow through the air intake.

Like a conventional direct injection engine, compression of the intake air raises its temperature such that at the end of the compression stroke, the pressure and temperature within combustion chamber 10 is sufficient to ignite pilot fuel 16 shortly after it is introduced (that is, after the ignition delay). The ignition of pilot fuel 16 ensures the ignition of main fuel 17. The quantities of pilot fuel 16 and main fuel 17 introduced in the low load operating mode may be adjusted depending upon the calculated total fuel requirement which is determined from the detected load conditions on the engine.

Figure 3A:
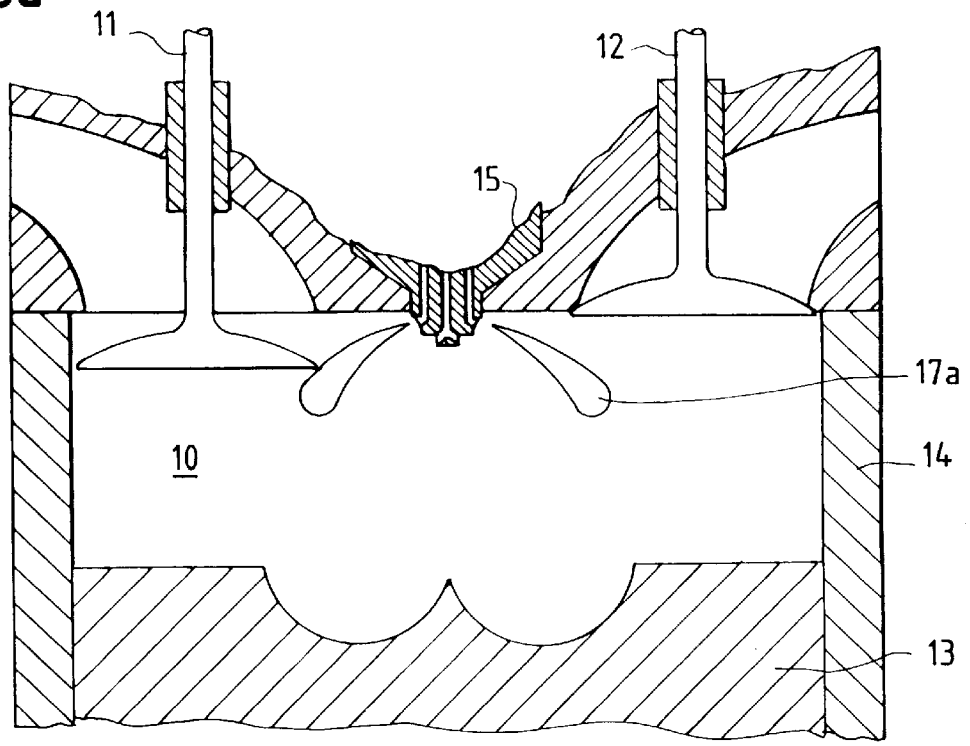
FIGS. 3a and 3b, depicts partial cross section views of an engine combustion chamber, showing the sequential injection of fuel into the combustion chamber under high load conditions.

FIG. 3 illustrates a preferred method of introducing fuel into combustion chamber 10 when a high load operating mode is employed. The high load operating mode introduces fuel to combustion chamber 10 in three stages. In the first stage, depicted in FIG. 3*a*, piston 13 is moving away from injector 15 during the intake stroke. Intake air is drawn into cylinder 14 through open intake valve 11. In the first stage, main fuel 17*a* is also introduced into cylinder 14 where it mixes with the intake air. In an alternative embodiment (not shown), first stage main fuel introduction may be timed to occur when piston 13 is at bottom dead center or during the compression stroke, when piston 13 is moving towards injector 15 and intake valve 11 is closed. However, delaying first stage main fuel introduction reduces the opportunity for main fuel 17*a* to mix with the intake air. Accordingly, if the first stage is timed to occur during the compression stroke, it is preferable for it to occur during the early part of the compression stroke, when piston 13 is near bottom dead center.

The quantity of fuel introduced during the first stage is limited to reduce the likelihood of early detonation (that is, knocking). The maximum fuel to air ratio sustainable without causing knocking is referred to as the engine's knock limit. By limiting the quantity of fuel that is introduced during the first stage so that the fuel to air ratio is less than the knock limit, there is no need to reduce the compression ratio and the engine's cycle efficiency may be maintained.

Figure 3B:
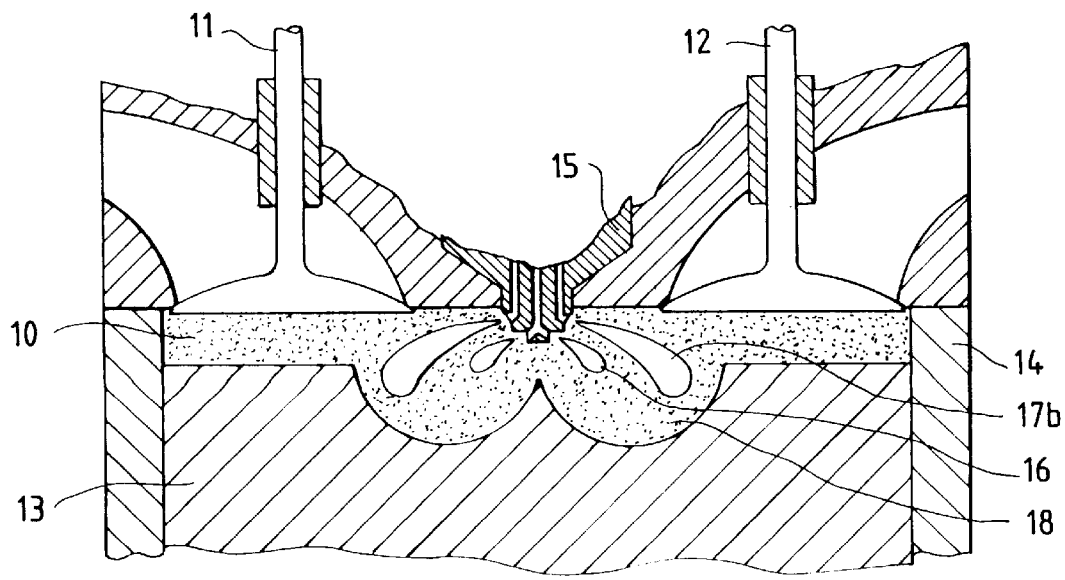

The second stage pilot fuel introduction occurs when piston 13 is near top dead center, as shown in FIG. 3*b*. Similar parameters are considered, as with the introduction of pilot fuel in the low load operating mode. That is, parameters such as engine speed must be taken into account to set the timing of the pilot fuel injection to allow for the ignition delay. Preferably, ignition is coordinated with about the time when piston 13 reaches top dead center. At the beginning of the power stroke, first stage main fuel 17*a* injected earlier in the engine cycle has mixed with intake air to form substantially homogenous fuel-air mixture 18. When pilot fuel 16 auto-ignites in combustion chamber 10, combustion of pilot fuel 16 ensures combustion of fuel-air mixture 18. Because the fuel-air mixture 18 is substantially homogenous, it burns in a propagation mode of combustion. In addition, the fuel to air ratio of mixture 18 remains lean, thus yielding the benefits of at least a portion of the combustion being "lean burn combustion" (that is, resulting in reduced emissions of $NO_x$ and particulate matter).

Since the quantity of main fuel introduced in the first stage was limited to prevent knocking, however, if more fuel is needed to satisfy the engine load requirements during high load conditions, an additional quantity of main fuel 17*b* is introduced in the third stage. Preferably, the third stage occurs simultaneously or sequentially after the second stage pilot fuel introduction. In FIG. 3*b*, piston 13 is moving away from injector 15, propelled by the combustion of fuel in combustion chamber 10. If the third stage occurs sequentially after the second stage, the third stage preferably occurs during the early part of the power stroke, since introduction of additional fuel early in the power stroke has a greater effect than if it is added later. The third stage main fuel introduction is preferably completed before the crankshaft connected to piston 13 has rotated more than 30 degrees beyond the point when piston 13 was at top dead center at the beginning of the power stroke. Similar to the low load operating mode, pilot fuel 16 and third stage main fuel 17*b* may be injected simultaneously or in an overlapping manner.

Because main fuel 17*b* is introduced at the end of the compression stroke or during the power stroke, it does not have an opportunity to thoroughly mix with the air in combustion chamber 10. Accordingly, third stage main fuel 17*b* burns in substantially a diffusion mode of combustion. Since the quantity of fuel introduced in the first stage is limited by the engine's knock limit, during high load conditions, engine power output is controlled by adjusting the quantity of main fuel 17*b* introduced during the third stage.

When the main fuel is a fuel such as natural gas or hydrogen gas, and the pilot fuel is diesel fuel, introducing an additional charge of main fuel in the third stage increases the proportion of main fuel that may be employed to satisfy engine requirements under high load conditions. Increasing the proportion of main fuel reduces the quantity of diesel fuel consumed, thereby reducing $NO_x$ and particulate matter emissions. In a preferred embodiment of the high load operating mode, the quantity of pilot fuel 16 represents about 1–10% of the total quantity of fuel on an energy basis, with main fuel 17*a* and 17*b* providing the balance.

Accordingly, the disclosed method of introducing main fuel and pilot fuel in three stages during high load conditions reduces the likelihood of knocking, provides efficient operation by utilizing both propagation and diffusion modes of combustion, and maintains high engine power output while reducing $NO_x$ and particulate matter emissions compared to conventional methods of operation.

With some engines it may also be desirable to define an intermediate operating mode in addition to the low and high operating modes. For example, an intermediate operating mode may be selected when load conditions are within region B in FIG. 1*b*. In a preferred embodiment, the line between region B and region A is defined by the flammability limit and the line between region B and region C is defined by the knock limit.

Figure 4A:
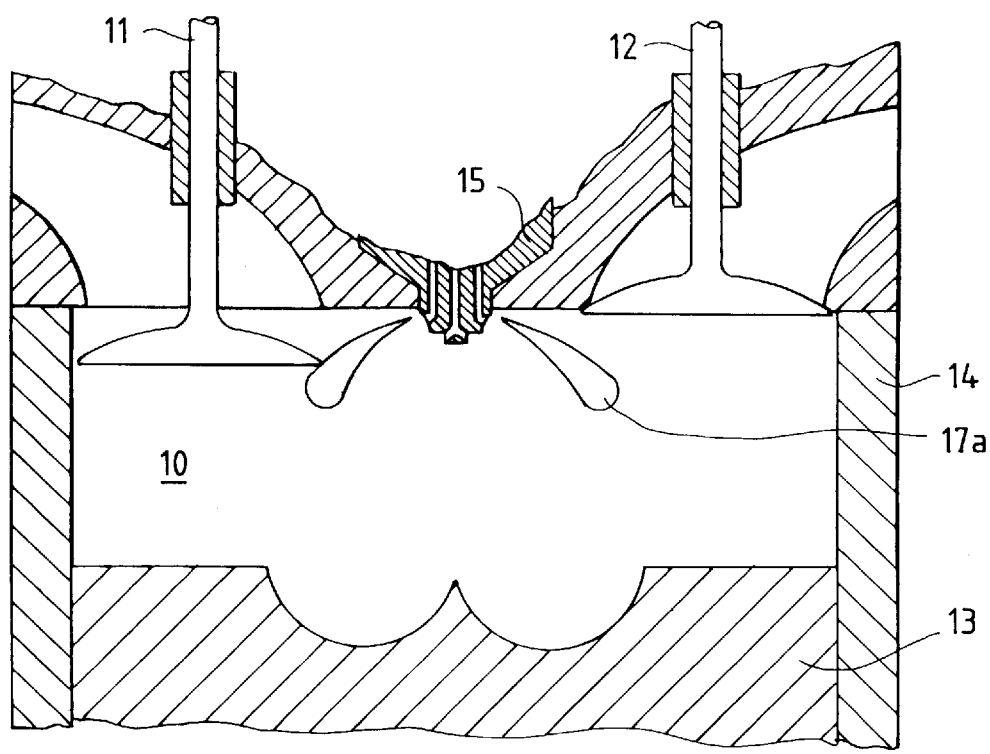
FIGS. 4a and 4b, depicts partial cross section views of an engine combustion chamber, showing the sequential injection of fuel into the combustion chamber under intermediate load conditions.

FIG. 4 illustrates a method of introducing fuel into combustion chamber 10 when an intermediate load operating mode is employed. The intermediate load operating mode introduces fuel to combustion chamber 10 in two stages. In this mode, the fuel to air ratio is higher than the flammability limit and lower than the knock limit, so all of main fuel 17*a* may be introduced into combustion chamber 10 during the first stage, depicted in FIG. 4*a*. Within this operating mode, the quantity of main fuel 17*a* introduced into combustion chamber 10 may be adjusted in response to engine load.

In FIG. 4*a*, piston 13 is moving away from injector 15 during the intake stroke. Intake air is drawn into cylinder 14 through open intake valve 11. Early introduction of main fuel 17*a* into cylinder 14 allows all of main fuel 17*a* to mix with the intake air during the remainder of the intake stroke and the whole of the compression stroke. In an alternate method, similar to the first stage of the high load operating mode, main fuel introduction may be timed to occur during the compression stroke (not shown), when piston 13 is moving towards injector 15 and intake valve 11 is closed. However, as described above, delaying first stage main fuel introduction reduces the opportunity for main fuel 17*a* to mix with the intake air. Accordingly, if the first stage is timed to occur during the compression stroke, it is preferable for it to occur during the early part of the compression stroke, when piston 13 is near bottom dead center.

Figure 4B:
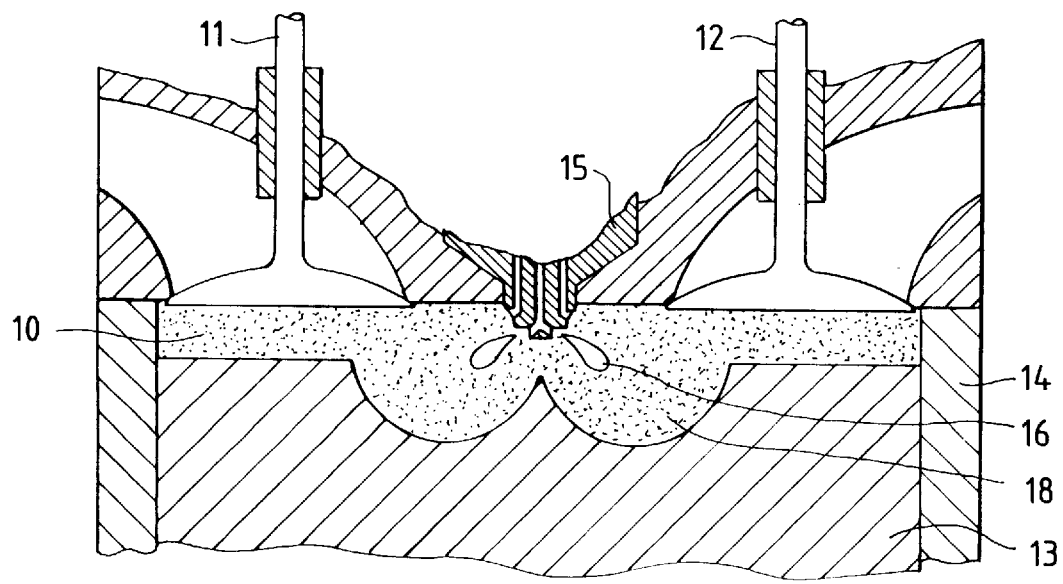

As depicted in FIG. 4*b*, the second stage occurs at the end of the compression stroke, timed so that pilot fuel 16 ignites after the ignition delay, substantially when piston 13 is at top dead center at the beginning of the power stroke. When piston 13 reaches top dead center, at the beginning of the power stroke, first stage main fuel 17*a* has mixed with intake air to form substantially homogenous fuel-air mixture 18. When pilot fuel 16 auto-ignites in combustion chamber 10, the combustion of pilot fuel 16 and fuel-air mixture 18 begins. Because, in the intermediate load operating mode, all of the main fuel is well mixed with air in mixture 18, it burns in a propagation mode of combustion, providing the full benefits of "lean burn combustion" (that is, reduced emissions of $NO_x$ and particulate matter).

Figure 5:
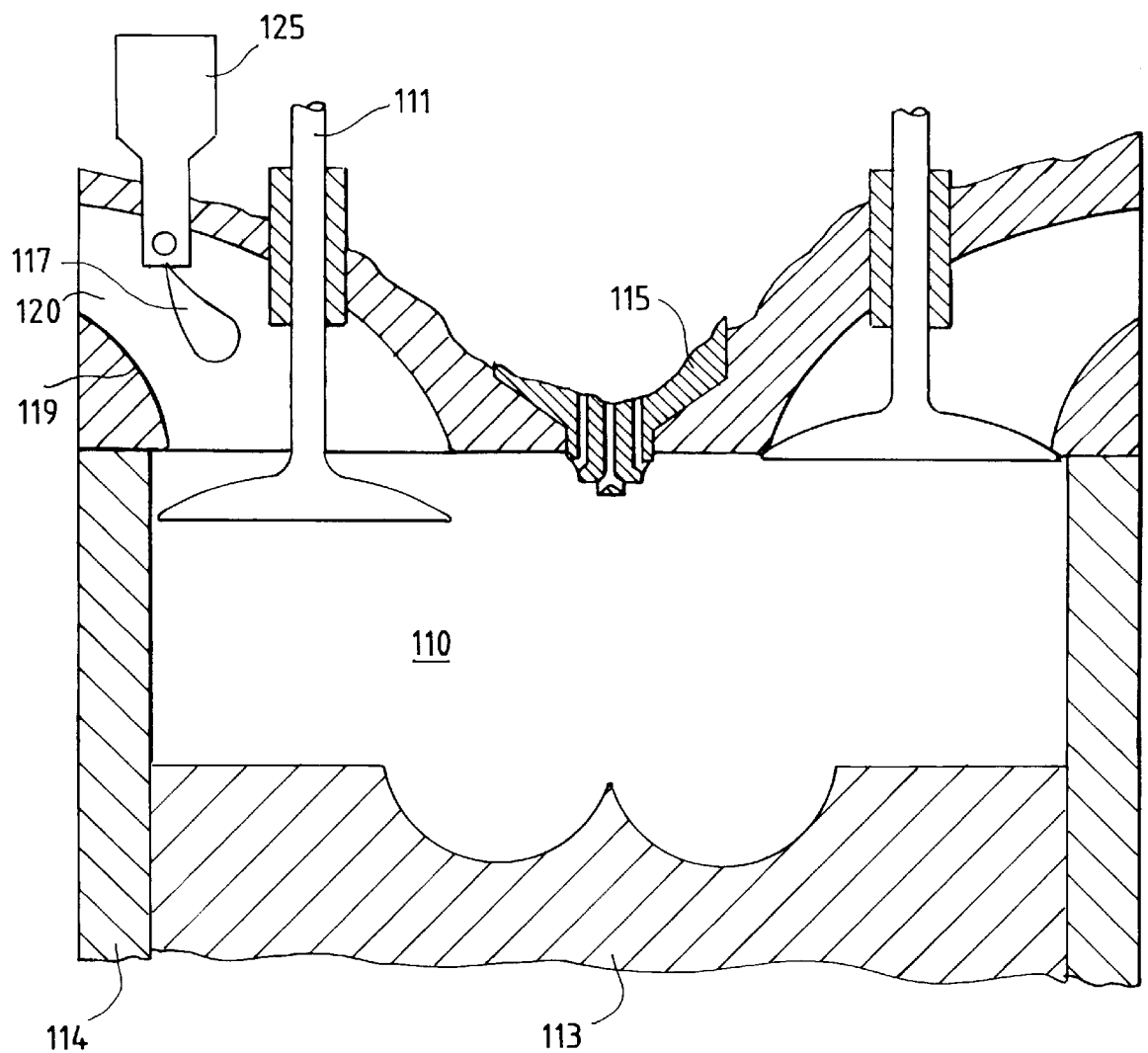
FIG. 5 is a partial cross section view of a combustion engine that depicts an alternative arrangement for mixing the main fuel with the intake air. In this arrangement, instead of mixing the main fuel and intake air in the combustion chamber, they are pre-mixed external to the combustion chamber (that is, prior to being introduced into the combustion chamber).

FIG. 5 depicts an alternative arrangement for introducing main fuel 117 into cylinder 114 during the intake stroke when the intermediate or high load operating modes are employed. Rather than mixing gaseous main fuel 117 and air 120 in cylinder 114, auxiliary injector 125 introduces main fuel 117 into the air induction system so that main fuel 117 mixes with air 120 before being drawn into combustion chamber 110. FIG. 5 depicts, for example, main fuel 117 being introduced into air induction passage 119 (that is, an air intake manifold). However, persons skilled in the art will appreciate that auxiliary injector 125 may also be located further upstream in the air induction system. Such pre-mixing is known as "fumigation". The fuel-air mixture is then introduced to combustion chamber 110 during the intake stroke. The introduction of the mixture may be controlled by any known means, such as, for example, intake valve 111. Compression of the mixture, the pilot fuel injection phase, combustion, and subsequent introduction of additional main fuel (if any), proceed through injector 115, as depicted and explained above with reference to FIGS. 3b or 4b, depending upon whether it is a high load or an intermediate load condition.

For engines that comprise a plurality of pistons, a plurality of auxiliary injectors may be employed, or auxiliary injector 125 may located further upstream in the air induction system to serve all of the pistons.

Figure 6:
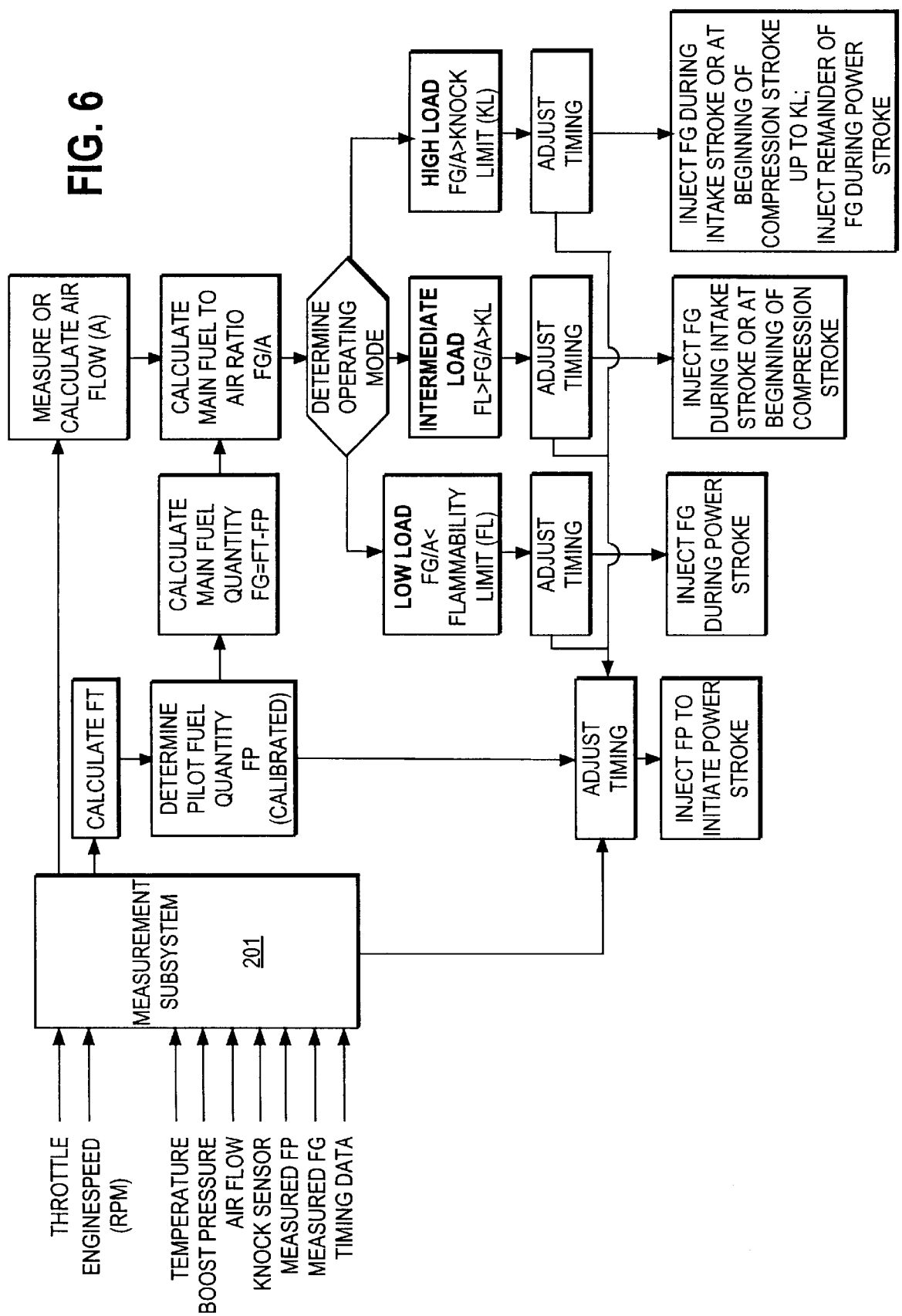
FIG. 6 is a control logic diagram that provides an example of the logic that might be employed by an electronic control unit to implement the disclosed method.

In a preferred embodiment, the proportion of main fuel to pilot fuel and the timing for introducing fuel into the engine's combustion chamber is determined by an electronic control unit (ECU). FIG. 6 is a control logic diagram that depicts the logic that such an ECU may be programmed to follow.

With reference to FIG. 6, a measurement subsystem 201 may be used to collect data relating to current operating conditions. In a preferred embodiment, measurement subsystem 201 collects data relating to the throttle position and the engine speed. Measurement subsystem 201 may optionally provide additional data, such as intake air temperature, engine coolant temperature, intake air boost pressure, air flow, and information that indicates the occurrence of knocking.

For example, the ECU preferably receives data indicating the measured throttle position and uses this data to calculate, on an energy basis, the amount of fuel (Ft) required to satisfy the current engine load. The ECU then determines the desired quantity of pilot fuel (Fp), which may be obtained, for example, from a look-up table that has been calibrated for the engine. The quantity of main fuel (Fg) is then easily calculated (that is, Fg=Ft−Fp).

Meanwhile, the ECU may also receive data from measurement subsystem 201 that indicates the current air flow (A), or data that the ECU can use to calculate A. With Fg and A known, ECU can calculate the main fuel to air ratio (that is, Fg/A).

In the preferred embodiment, measurement subsystem 201 also sends data to the ECU indicating the current engine speed. Accordingly, with Fg/A and engine speed known, the ECU can determine the desired operating mode, by referring, for example, to a look-up table that stores information similar to that depicted in FIG. 1. In the preferred embodiment, a low load operating mode is selected if Fg/A is less than the flammability limit (FL), a high load operating mode is selected if Fg/A is greater than the Knock Limit (KL), and an intermediate operating mode is selected if Fg/A is greater than FL and less than KL.

After the desired operating mode is selected, the timing is set for introducing the fuel into the combustion chamber. As described above, timing and the sequence of main fuel and pilot fuel injection depends upon the selected operating mode. In addition, the specific timing within an operating mode may also be dictated by engine speed and the quantity of fuel to be injected. Accordingly, after the ECU determines the desired operating mode, main fuel and pilot fuel injection timing is set. Finally, the main fuel and pilot fuel are injected into the combustion chamber at the appropriately set times.

In an embodiment where the measurement subsystem detects the occurrence of knocking, the ECU may recalibrate its stored values in its memory to re-calibrate the value for knock limit KL to prevent the re-occurrence of knocking. That is, if knocking is detected during a high load operating mode, the ECU may re-calibrate itself to reduce the quantity of main fuel that is introduced during the first stage. If knocking is detected during an intermediate load operating mode, the ECU may prevent the re-occurrence of knocking by re-calibrating itself to select the high load operating mode the next time the same load conditions are encountered.

As used herein, the term "throttle" or "throttle position" has been used in a general sense to convey the load request on the engine. Typically, such a load request is set by the user and may be a foot pedal placement (in the case of a vehicular engine) or a predetermined load request (in the case of an energy generating engine). In general, there are many ways in which a user may set the load request and the term "throttle" (as used in this application) should be understood in this general sense.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of introducing fuel into a combustion chamber of an operating four-stroke internal combustion engine having at least one cylinder with a piston, wherein said fuel comprises a main fuel and a pilot fuel that is more readily auto-ignitable than said main fuel, said method comprising:

(a) detecting a set of load conditions on said engine;
   (b) employing a low load operating mode when a first predetermined set of load conditions is detected, and employing a high load operating mode when a second predetermined set of load conditions is detected, wherein an operable engine speed, said second set of load conditions corresponds to an engine load that is greater than the engine load corresponding to said first predetermined set of load conditions;
   (c) in said low load operating mode, introducing said pilot fuel and said main fuel into said combustion chamber when said cylinder is pressurized, when said piston is at or near top dead center;
   (d) in said high load operating mode comprises a three stage sequential introduction of said pilot fuel and said main fuel into said combustion chamber, whereby a first portion of said main fuel is introduced in a first stage during an intake or compression stroke, said pilot fuel is introduced in a second stage so that it ignites at the beginning of a power stroke, and a second portion of said main fuel is introduced in a third stage.

2. The method of claim 1 wherein said low load operating mode further comprises introducing said pilot fuel in a timed manner such that said pilot fuel ignites at the beginning of a power stroke when said piston is at or near top dead center, and said main fuel is introduced sequentially after said pilot fuel.

3. The method of claim 2 wherein, when at least a portion of said main fuel is introduced sequentially after said pilot fuel, said at least a portion of said main fuel is introduced within between zero and fifty degrees of crankshaft rotation after the introduction of said pilot fuel.

4. The method of claim 1 wherein said first stage main fuel introduction is completed before said second stage pilot fuel introduction has commenced.

5. The method of claim 1 wherein said first stage main fuel is introduced during said intake stroke.

6. The method of claim 1 wherein said first stage main fuel is introduced when said piston is at or near bottom dead center.

7. The method of claim 1 wherein said second stage pilot fuel is introduced when said piston is near top dead center near the end of said compression stroke.

8. The method of claim 1 wherein said second stage pilot fuel introduction continues when said third stage main fuel introduction is commenced.

9. The method of claim 1 wherein the introduction of said second stage pilot fuel and said third stage main fuel are commenced substantially simultaneously.

10. The method of claim 1, further comprising:
(e) employing an intermediate load operating mode when a third predetermined set of load conditions is detected, wherein at an operable engine speed, said third predetermined set of load conditions corresponds to an engine load that is greater than the engine load corresponding to said first predetermined set of load conditions and said third predetermined set of load conditions corresponds to an engine load that is less than the engine load corresponding to said second predetermined set of load conditions;
wherein said intermediate load operating mode comprises sequentially introducing said pilot and said main fuel into said combustion chamber, whereby said main fuel is introduced into said combustion chamber before said pilot fuel and said pilot fuel introduction occurs at or near top dead center, and the main fuel introduction is timed such that said pilot fuel ignites substantially at the beginning of a power stroke.

11. The method of 10 wherein, when said intermediate load operating mode is employed, said main fuel is introduced in a manner such that a substantial quantity of said main fuel intermixes with air within said cylinder prior to combustion.

12. The method of 10 wherein when said intermediate load operating mode is employed, said main fuel is introduced into said combustion chamber during an intake stroke.

13. The method of claim 1 wherein the quantity of said main fuel introduced during said third stage is variable and dependent upon said detected set of load conditions such that the quantity of said main fuel introduced during said third stage increases when said detected set of load conditions indicates that engine load is increasing.

14. The method of claim 13 wherein the quantity of said main fuel introduced during said first stage is variable and dependent upon said detected set of load conditions and a calibrated knock limit such that the quantity of main fuel introduced during said first stage maintains a main fuel to air ratio that is less than said knock limit.

15. The method of claim 13 wherein the quantity of said main fuel introduced during said first stage is substantially constant and provides a main fuel to air ratio that is less than a calibrated knock limit.

16. The method of claim 1 wherein said first predetermined set of load conditions is determined when the main fuel to air ratio is less than a calibrated flammability limit of a homogeneous mixture of said main fuel and intake air.

17. The method of claim 1 wherein detecting said set of load conditions on said engine comprises measuring engine speed and engine throttle position.

18. The method of claim 1 wherein detecting said set of load conditions on said engine comprises measuring engine intake air temperature and/or engine coolant temperature.

19. The method of claim 1 wherein detecting said set of load conditions on said engine comprises measuring intake air boost pressure.

20. The method of claim 1 wherein detecting said set of load conditions on said engine comprises measuring air flow into said combustion chamber.

21. The method of claim 1 wherein detecting said set of load conditions on said engine comprises sensing pre-mature detonation within said cylinder.

22. The method of claim 1 wherein said first stage main fuel is pre-mixed with intake air prior to being introduced into said combustion chamber.

23. The method of claim 10 wherein, during said intermediate load operating mode, said main fuel is mixed with intake air prior to being introduced into said combustion chamber.

24. The method of claim 1 further comprising defining a predetermined main fuel to pilot fuel ratio (Fg/Fp) dependent upon the detected set of load conditions on said engine and introducing quantities of main fuel and pilot fuel to said combustion chamber in accordance with said predetermined Fg/Fp ratio.

25. The method of claim 24 wherein the quantity of main fuel introduced during said first stage in said high load operating mode is limited to prevent the main fuel to air ratio from exceeding a calibrated knock limit.

26. The method of claim 1 further comprising employing a control system to control the timing for introducing said main fuel and said pilot fuel into said combustion chamber in accordance with said detected set of load conditions.

27. The method of claim 1 wherein said main fuel is gaseous.

28. The method of claim 27 wherein said main fuel is selected from the group consisting of natural gas, gaseous hydrogen and liquefied petroleum gas.

29. The method of claim 1 wherein said pilot fuel is liquid.

30. The method of claim 29 wherein said pilot fuel is selected from the group consisting of diesel fuel and dimethylether.

31. The method of claim 1 wherein said engine provides power to a vehicle.

32. A method of introducing fuel into a combustion chamber of an operating internal combustion engine having at least one cylinder with a piston, said fuel comprising a main fuel and a pilot fuel that is auto-ignitable to a degree greater than said main fuel, said method comprising sequentially introducing said fuel into said combustion chamber in three stages, whereby:
(a) a first portion of said main fuel is introduced in a first stage;
(b) said pilot fuel is introduced in a second stage; and
(c) a second portion of said main fuel is introduced in a third stage;

wherein the quantity of said first portion of main fuel is controlled to provide a main fuel to air ratio during a compression stroke that is less than a calibrated knock limit.

33. The method of claim 32 wherein said first stage occurs during an intake stroke.

34. The method of claim 32 wherein said second stage occurs during a compression stroke and is timed in duration such that said pilot fuel ignites when said piston is at the beginning of a power stroke.

35. An apparatus for introducing fuel into a combustion chamber of an operating internal combustion engine having at least one cylinder with a piston associated therewith, said fuel comprising a main fuel and a pilot fuel that is auto-ignitable to a degree greater than said main fuel, said apparatus comprising:
(a) measuring devices for collecting operational data from said engine, wherein said measuring devices comprise a tachometer for measuring engine speed and a sensor for determining throttle position;
(b) an electronic control unit that receives said operational data and processes said data to compute a set of load conditions, said electronic control unit comprising memory for storing control sets of load conditions and predetermined operating modes for said control sets of load conditions, said electronic control unit matching said computed set of load conditions with said control sets of load conditions to select one of said predetermined operating modes;
(c) a main fuel injector controlled by said electronic control unit to introduce said main fuel into said combustion chamber at times and in quantities determined by said electronic control unit in accordance with said predetermined operating modes and said set of load conditions; and
(d) a pilot fuel injector controlled by said electronic control unit to introduce said pilot fuel into said combustion chamber at times and in quantities determined by said electronic control unit in accordance with said predetermined operating modes and said set of load conditions;

wherein said predetermined operating modes comprise a low load operating mode when said pilot fuel and said main fuel are introduced into said combustion chamber when said cylinder is pressurized; and a high load operating mode that comprises a three stage sequential introduction of fuel into said combustion chamber, whereby a first portion of said main fuel is introduced in a first stage, said pilot fuel is introduced in a second stage, and a second portion of said main fuel is introduced in a third stage.

36. The apparatus of claim 35 wherein said measuring devices further comprise a probe for measuring engine intake air temperature.

37. The apparatus of claim 35 wherein said measuring devices further comprise a probe for measuring engine coolant temperature.

38. The apparatus of claim 35 wherein said measuring devices further comprise a device for measuring intake air boost pressure.

39. The apparatus of claim 35 wherein said measuring devices further comprise a flow meter for measuring air flow into said combustion chamber.

40. The apparatus of claim 35 wherein said measuring devices further comprise a device for detecting pre-mature detonation within said combustion chamber.

41. The apparatus of claim 40 wherein said electronic control unit may reduce the quantity of said main fuel introduced in said first stage when pre-mature detonation is detected.

42. The apparatus of claim 35 wherein said main fuel injector and said pilot fuel injector are integrated into a dual fuel injector that may inject each one of said main fuel and said pilot fuel independently from the other.

43. The apparatus of claim 35 further comprising an auxiliary injector associated with an air induction system for introducing main fuel into an air induction passage so that it may mix with intake air prior to being introduced to said combustion chamber.

44. The apparatus of claim 43 wherein said air induction passage is an air induction manifold.

45. The apparatus of claim 43 wherein said engine comprises a plurality of pistons and a plurality of auxiliary injectors.

* * * * *